May 19, 1925.
H. G. TRENCH ET AL
COVERING FOR AUTOMOBILE STEERING WHEELS
Filed Dec. 8, 1923
1,538,147
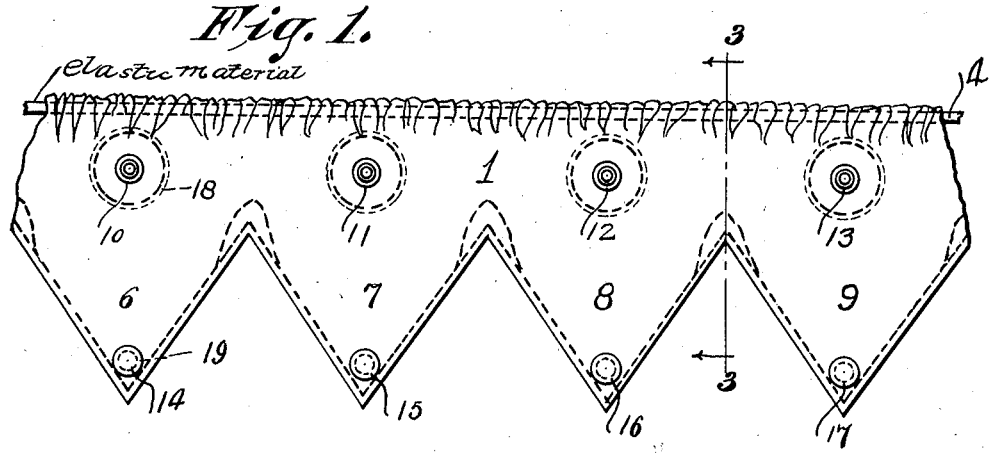
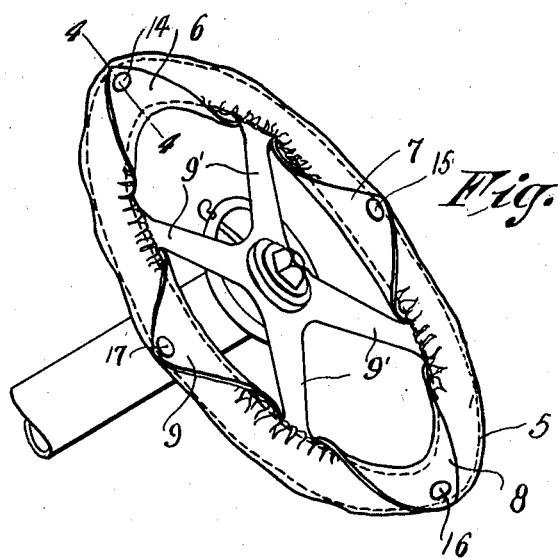
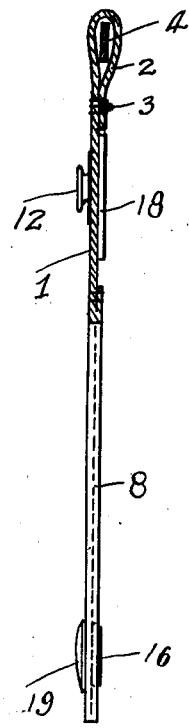
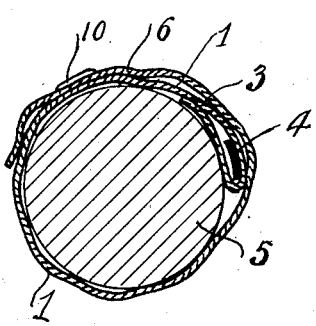
INVENTORS
Harry G. Trench,
Walter C. Osborn
Harry W. Bowen.
BY
ATTORNEY.

Patented May 19, 1925.

1,538,147

UNITED STATES PATENT OFFICE.

HARRY G. TRENCH AND WALTER C. OSBORN, OF HARTFORD, CONNECTICUT.

COVERING FOR AUTOMOBILE STEERING WHEELS.

Application filed December 8, 1923. Serial No. 679,418.

*To all whom it may concern:*

Be it known that we, HARRY G. TRENCH and WALTER C. OSBORN, citizens of the United States, residing at Hartford, in the county of Hartford and State of Connecticut, have invented new and useful Improvements in Coverings for Automobile Steering Wheels, of which the following is a specification.

This invention relates to improvements in devices for covering the steering wheel of a motor vehicle for the purpose of maintaining the rim or handle portion of the wheel clean, when a motor vehicle is taken to a garage, or repair shop, the soiled and greasy hands of the person, or persons, who are engaged in repairing the vehicle often leave the steering wheel in a soiled condition. This condition is very objectionable for, when the vehicle is to be removed from the garage or repair shop the grease and other substances contained on the wheel are transferred or taken up by the hands or clothing of the driver and often resulting in permanently staining the clothing. The present invention is therefore designed to overcome these objections and to furnish or provide a suitable and detachable covering for the wheel, and, one that may be quickly applied and removed, also, one that is made from a washable material as heavy canvas or other similar material.

Briefly, the covering device comprises a piece, or strip of flexible material which is formed with a turned over edge in which is placed a strip of elastic material. Its opposite edge is formed with a plurality of pointed projections, or flaps, and suitable detachable fastening or securing devices for attaching the flaps to the main or body part of the covering device. The ends of the strip of flexible material are preferably secured together to form a ring-like structure which can be extended or stretched sufficiently in order to place it on the wheel. If desired the article may be formed from a flat piece of material by cutting a central opening. The devices for securing the covering in place are then engaged whereby the wheel is completely covered.

Referring to the drawings:

Fig. 1 is a developed view of the article showing the turned over edge and strip of elastic material therein; the flaps and cooperating securing devices.

Fig. 2 is a perspective view showing the article in place on the wheel.

Fig. 3 is an enlarged detail sectional view on the line 3—3 of Fig. 1, and

Fig. 4 is a detail sectional view on the line 4—4 of Fig. 2 showing the article wrapped around the rim of the wheel.

Referring to the drawings in detail:

1 designates the body part of the article which is formed with a folded or turned over edge 2 that is secured to the body part with the stitches 3. Located in this folded or turned over part is a strip of elastic fabric 4, the ends of which are secured together when the ends of the body part 1 are connected. The elastic fabric serves to normally contract the normal size of the article but will permit it to be stretched sufficiently to be placed over a rim 5 of the wheel. 6, 7, 8, and 9 are V-shaped portions that are integral with the body part 1, and, as shown there are four in number corresponding to the number of the spaces between the spokes 9' of the wheel. For the purpose of securing the covering device on the wheel, grommets or snap-fasteners, are employed indicated at 10, 11, 12, and 13 on the body part, and, cooperating parts 14, 15, 16, and 17 on the V-shaped portions.

The covering is applied as follows: The operator stretches or extends the elastic fabric 4 sufficiently to permit the ring-like article to be placed on the wheel, then the flaps 6, 7, 8, and 9 are carried or wrapped around the rim of the wheel and through the four spaces between the spokes as shown in Fig. 2, and the snap-fastening devices 14, 15, 16, and 17 are snapped onto their cooperating parts 10, 11, 12, and 13 on the body part 1, thus completely covering the rim part 5 of the wheel.

In order to prevent the snap fastening devices from pulling out of the fabric, patch pieces of suitable material are placed on the fabric as indicated at 18 and 19. When it is desired to remove the covering it is only necessary to separate the snap fasteners, which releases the V-shaped portions. The body part 1 is now stretched sufficiently large enough to pass over the wheel.

What we claim is:

1. A covering device for a steering wheel comprising a piece of fabric material formed with a turned over edge, a strip of elastic material within the turned over part, the opposite edge of the piece having a plurality of substantially V-shaped portions for insertion between the spokes of the steering wheel, and detachable devices for securing the V-shaped portions to the body part of the fabric after being wrapped around the rim of the wheel as described.

2. A covering device for the steering wheel of a motor vehicle comprising a one piece body part of fabric material having a plurality of projections connected to the body part and designed to enter the space between the spokes of the wheel and for wrapping around the rim of the wheel, and means for connecting the projections to the body part.

3. A device for the purpose described comprising a piece of flexible material which is folded to produce a centrally located opening, an elastic member for normally contracting the opening to cause the member to closely engage the wheel when applied yet permitting the opening to be enlarged for placing the member over and onto the wheel, and flap portions designed to be wrapped around the wheel to completely inclose the rim and means for detachably connecting the flap portions to the main part of the member.

4. A covering device for a wheel rim comprising a one piece member of flexible material, which is folded to produce a centrally located opening, means for normally contracting the opening, the member having a plurality of extensions for wrapping around the rim, and means for detachably securing the extensions of the said piece to the main part of the member, said means including grommets or snap-fastening devices.

5. A covering device for a wheel rim comprising a one piece member of flexible material, which is folded to produce a centrally located opening, means for normally contracting the opening, the member having a plurality of extensions for wrapping around the rim, and means for detachably securing the extensions of the said piece to the main part of the member, said means including grommets or snap-fastening devices, said normally contracting means comprising a piece of elastic material which is located in a folded over part of the one piece member.

6. A device for covering the rim of a steering wheel of a motor vehicle, comprising a piece of flexible material that is folded to produce a centrally located opening and oppositely disposed edges, one of the edges being provided with means for closely wrapping around the rim of the wheel.

7. A removable covering device for the rim of a steering wheel of a motor vehicle which is composed of flexible material having a main body portion and flap portions the flap portions being designed to be wrapped around the rim, and means for detachably securing the flap portions to the body portion of the device.

8. A protective device for covering the rim of a steering wheel of a motor vehicle, said device being formed with a centrally disposed opening, and portion for wrapping around the rim, and means for detachably securing the device to the rim.

HARRY G. TRENCH.
WALTER C. OSBORN.